United States Patent
Maumus (10) Patent No.: US 6,231,709 B1
(45) Date of Patent: May 15, 2001

(54) METHOD OF MAKING A SPRING OUT OF THERMOSTRUCTURAL COMPOSITE MATERIAL

(75) Inventor: Jean-Pierre Maumus, Cenon (FR)

(73) Assignee: Societe Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/217,514

(22) Filed: Dec. 21, 1998

(30) Foreign Application Priority Data

Dec. 22, 1997 (FR) .................................................... 97 16233

(51) Int. Cl.$^7$ ................................ F16F 1/36; F16F 1/373; B32B 31/00
(52) U.S. Cl. ........................ 156/148; 156/149; 156/173; 156/256; 267/148
(58) Field of Search .................................. 156/250, 256, 156/166, 173, 148, 149; 267/148

(56) References Cited

U.S. PATENT DOCUMENTS

| 4,412,675 | 11/1983 | Kawakubo . | |
|---|---|---|---|
| 4,762,583 | * 8/1988 | Kaempen | 153/173 |
| 4,826,143 | * 5/1989 | Latorre et al. | 267/148 |
| 5,503,783 | * 4/1996 | Nakagawa et al. | 264/29.2 |

FOREIGN PATENT DOCUMENTS

| 2334971 | * 1/1975 | (DE) . | |
|---|---|---|---|
| 0 684 216 | 11/1995 | (EP) . | |
| 8-42550 | * 2/1996 | (JP) . | |
| 9-79248 | * 3/1997 | (JP) . | |
| 96/32527 | * 10/1996 | (WO) | 156/148 |

* cited by examiner

Primary Examiner—Jeff H. Aftergut
(74) Attorney, Agent, or Firm—Weingarten, Schurgin, Gagnebin & Hayes LLP (57) ABSTRACT

A fiber preform is made from a fiber block by forming at least one cut in the block, so as to make a gap between two portions of the preform corresponding to segments of a spring that is to be made, and the preform is densified by a material for constituting the matrix of the thermostructural composite material. The gap between two portions of the preform is provided either by removing material, preferably after the preform has been consolidated, or else by forming a slot and then spacing apart the lips of the slot and holding the preform in the spaced-apart state.

11 Claims, 6 Drawing Sheets

METHOD OF MAKING A SPRING OUT OF THERMOSTRUCTURAL COMPOSITE MATERIAL

FIELD OF THE INVENTION

The invention relates to making springs out of thermostructural composite material.

BACKGROUND OF THE INVENTION

Springs are mechanical components in very widespread use. They are generally made of metal, which poses problems when the equipment in which the springs are incorporated is used at a temperature that is very high or in a medium that is very aggressive.

In order to solve those problems, it is reasonable to propose replacing the metal constituting a spring with a material that is capable of withstanding such operating conditions without damage, and in particular with a thermostructural composite material.

Thermostructural composite materials are characterized by their mechanical properties which make them suitable for constituting structural elements, and by their ability to conserve these properties up to temperatures that are very high.

Well-known thermostructural composite materials are carbon/carbon composite materials (C/Cs) constituted by fiber reinforcement made of carbon fibers and densified by a carbon matrix, and ceramic matrix composite materials (CMCs) constituted by fiber reinforcement made of refractory fibers, e.g. carbon fibers or ceramic fibers, and densified by a ceramic matrix.

In addition to their refractory nature, C/Cs and CMCs have the advantage of being capable of withstanding certain atmospheres that are particularly corrosive for metals.

Proposals have already been made for making springs out of C/C composite materials.

Thus, document U.S. Pat. No. 4,412,675 discloses a method consisting in preparing an organic material filled with carbon fibers, in shaping it to obtain a helical spring, and then applying heat treatment for carbonization purposes. Nevertheless, that method is limited to making helical springs and it is relatively complex in that it requires prior preparation of compounds that are suitable for being extruded so that they can be coiled.

Document EP-A-0 684 216 discloses two methods: one consisting in making a helical coil from a thread that is pre-impregnated or surrounded in a polymer sleeve, and then molded under pressure, the other consisting in making a workpiece out of C/C material and then in machining the spring from the workpiece. The first method is limited to making helical springs and requires equipment suitable for molding springs of particular shapes under pressure. The second method leads to springs of very high cost given that C/C composite materials are expensive and large amounts of material are lost in the machining.

Brief Description of the Invention

The object of the invention is to provide a method of making a spring out of thermostructural composite material while avoiding the above-specified drawbacks. This object is achieved by a method comprising the steps consisting in:

making a fiber preform from a fiber block by forming at least one cut in the block, so as to provide a gap between two portions of the preform corresponding to segments (i.e. leaves or turns) of a spring that is to be made; and densifying the preform with a material for constituting the matrix of the thermostructural composite material.

The gap between portions of the preform can be obtained by removing material, preferably after the preform has been consolidated.

This gap can also be obtained by moving apart the lips of the slot and placing a temporary spacer element between them, the spacer element being held in place at least until the preform has been consolidated.

Consolidation consists in densifying the preform partially until it has acquired sufficient mechanical strength to enable it to retain its shape and to enable it to be handled without requiring supporting tooling, but without densifying the preform to a significant extent. Consolidation can be performed by pre-impregnation using a liquid composition, e.g. a resin, and then hardening the resin, or by partial pre-densification by chemical vapor infiltration, with complete densification of the preform being performed subsequently.

The method is suitable for making springs of various shapes. For example, for a leaf spring, the fiber preform can be made from a prismatic block in which a plurality of cuts are formed, substantially parallel to one another, each cut extending over part of the distance between opposite side zones of the block. For a helical spring, the fiber preform can be made from a cylindrical block with an axial bore, and a helical cut can be made through the block about its axis. For a flat spiral spring, the fiber preform can be made from a disk and a spiral-shaped cut can be formed through the disk. For a conical spiral spring, the fiber preform can be made from a hollow frustoconical block, and a spiral-shaped cut can be formed through the wall of the block.

The method of the invention thus differs from the above-mentioned prior art essentially in that the spring is shaped neither by coiling a thread nor by machining a workpiece made of thermostructural composite material, but by machining that is performed at the preform stage when the block is not densified or is incompletely densified.

Implementations of the method of the invention are described below by way of non-limiting indication.

DESCRIPTION OF THE PREFERRED EMBODIMENTS

A first step of the method of the invention consists in making a fiber block.

Figure 1A:
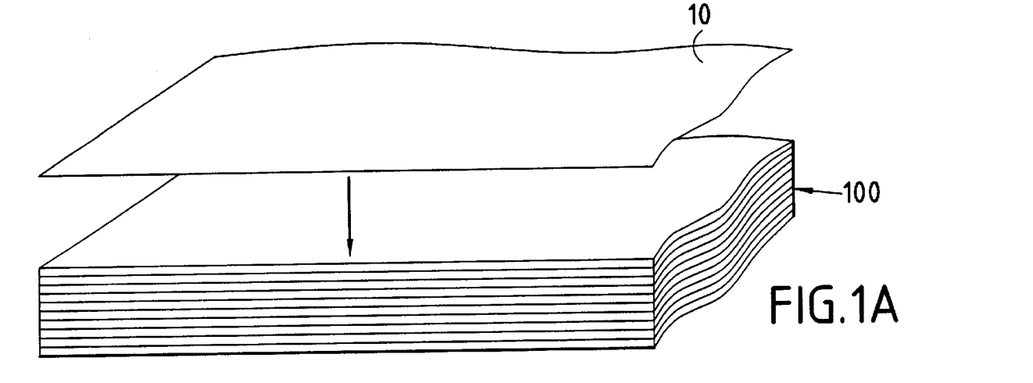
FIGS. 1A to 1D show successive steps in making a leaf spring out of thermostructural composite material, in a first implementation of the method of the invention.

A plurality of layers 10 of fiber fabric are superposed flat, as shown in FIG. 1A.

Each layer 10 may be constituted by a fabric that is essentially two-dimensional such as a woven cloth (two-directional fabric) or a sheet of unidirectional fibers (UD) or a felt. With UD sheets of fibers, the sheets are superposed in different directions.

The superposed layers can be bonded together by implanting threads or by transverse needling. A way of building up preforms by superposing fiber fabric layers while simultaneously needling them together is described in document U.S. Pat. No. 4,790,052.

A fiber block 11 is cut out from a workpiece 100 obtained in this way, with the dimensions of the block 11 being selected as a function of the dimensions of a spring preform or a set of spring preforms to be made. A plurality of fiber blocks 11 can be taken from a single workpiece 100, without excluding the possibility of making a workpiece 100 that has the dimensions required of a block 11.

In a second step (FIG. 1B), cuts are made in the form of slots 12, 13 in the block 11 provided in this way. In the example shown, the layers 10 are rectangular, such that the block 11 is a rectangular block and the slots extend perpendicularly to the longitudinal direction L which corresponds to the direction in which the future spring is to be expanded and compressed. The slots 12, 13 can be cut out by means of a blade or by means of a jet of water under pressure.

Figure 1B:
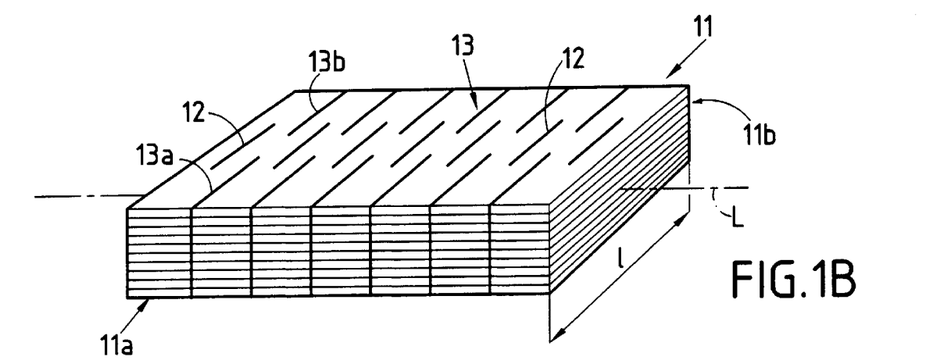

Slots 13 alternate with slots 12 along the direction L, with the slots 12 extending over a fraction of the width l of the block 11 between its side faces 11a and 11b but without opening out into said faces, while the slots 13 are made up of two same-length portions 13a and 13b extending from the faces 11a and 11b respectively, but without meeting in the middle, i.e. without passing right across the width of the block. Each of the slots 12 and 13 (13a and 13b) extends over more than half the width of the block.

After the slots 12 and 13 have been formed, the block 11 is expanded in the direction L (FIG. 1C), thereby opening up the slots so as to leave gaps 15, 16 (16a and 16b) between the portions of the block that correspond to the leaves of the spring that is to be made. The block is held in the expanded state by inserting spacers 17, 18 (18a and 18b) in the gaps formed in this way. By way of example, the spacers may be small flat graphite inserts.

Figure 1C:
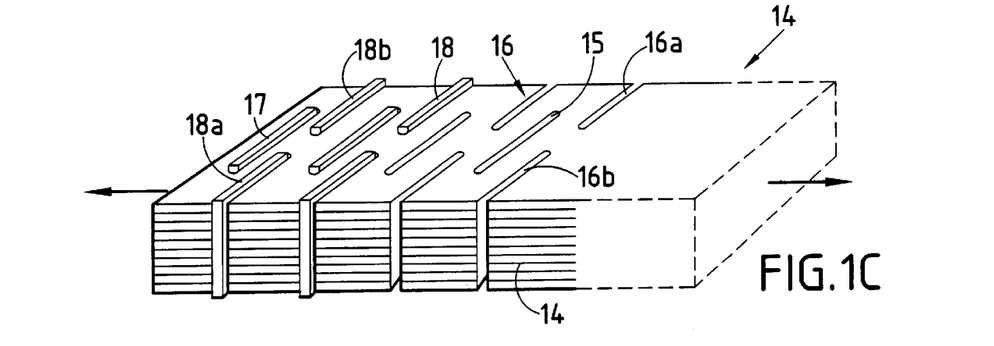

The respective dimensions in the L direction of the gaps 15, 16 and the portions of the block between said gaps determine the stiffness of the future spring. These respective dimensions may be constant, thereby imparting constant stiffness to the spring. In a variant, these respective dimensions may vary along the L direction so as to impart variable or differential stiffness to the spring. In which case, it can suffice to vary the width or the pitch of the gaps 15, 16.

The fiber preform 14 obtained in this way is consolidated while it is in the expanded state. To this end, it can be impregnated with a resin prior to being expanded and having the spacers inserted therein. The quantity of resin used is sufficient to ensure that after hardening the preform 14 retains its expanded shape even after the spacers have been withdrawn, but without the pores in the preform being completely filled.

In a variant, consolidation can be performed by pre-densification, e.g. by chemical vapor infiltration applied to a portion of the matrix of the desired thermo-structural composite material, said infiltration being interrupted once the preform has sufficient strength to allow the spacers to be withdrawn.

Figure 1D:
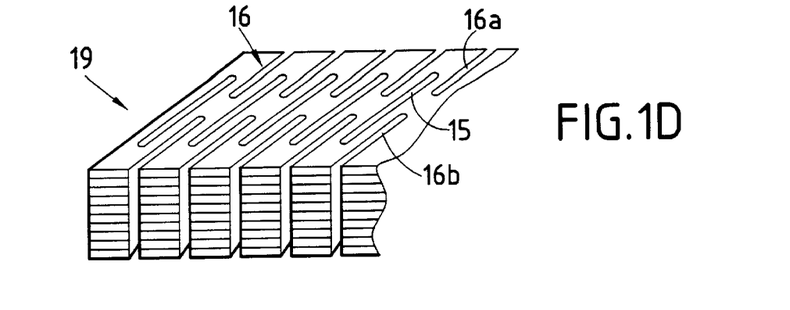

Thereafter, after the spacers have been withdrawn, the preform 14 continues to be densified, filling the residual pore spaces until the desired degree of densification has been obtained, thereby making it possible to obtain a leaf spring 19 made of thermo-structural composite material.

The thermostructural composite material can be a C/C composite material. The layers 10 of fiber fabric are then made of carbon fibers or of carbon-precursor fibers (preoxidized polyacrylonitrile, pitch, phenolics, cellulosics, . . . ), with the precursor being transformed, for example, after the block 11 has been formed. The matrix of the composite material is made of pyrolytic carbon. It can be obtained at least in part by a liquid process (impregnation with a precursor of carbon in the liquid state, e.g. a resin, followed by carbonization, possibly with a plurality of impregnation-carbonization cycles being performed), or by a gas process (chemical vapor infiltration).

In the description above, a single spring 19 is made from the block 11. It will immediately be apparent that a plurality of springs can be taken from the same block by cutting it along one or more planes perpendicular to the direction L. Such cutting can be performed before consolidation, after densification, or preferably after consolidation and before densification. The various springs taken from a single fiber block can be identical or different. When different, they may be of different lengths and/or of different stiffnesses, and the stiffness of each spring can be constant or varying.

The thermostructural composite material can be a CMC material. The layers 10 of fiber fabric are then made of carbon fibers or ceramic fibers, or out of a precursor of carbon or of ceramic. The matrix is made of ceramic, e.g. silicon carbide (SiC). It can be obtained by a liquid process or by a gas process.

Figure 2A:
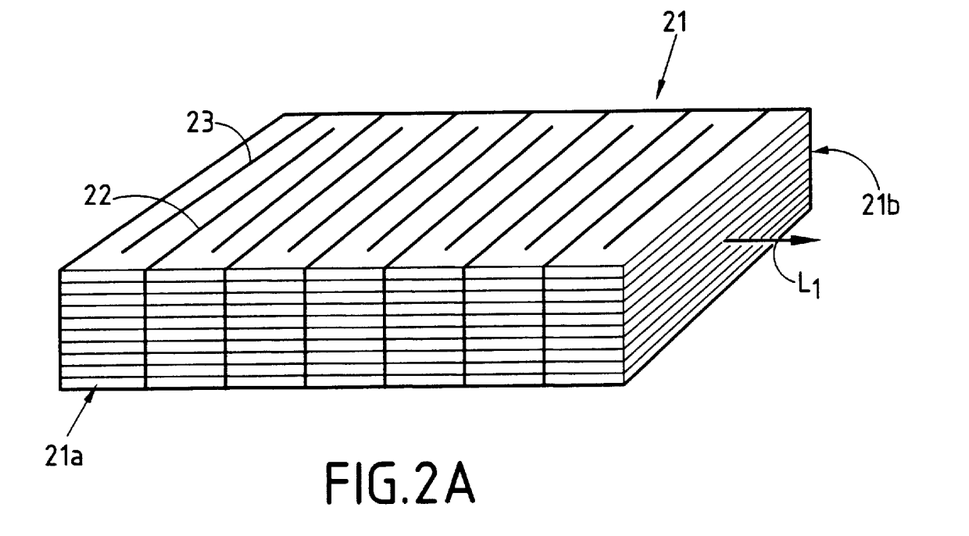
FIGS. 2A and 2B show a variant implementation of the method illustrated in FIGS. 1A to 1D.
Figure 2B:
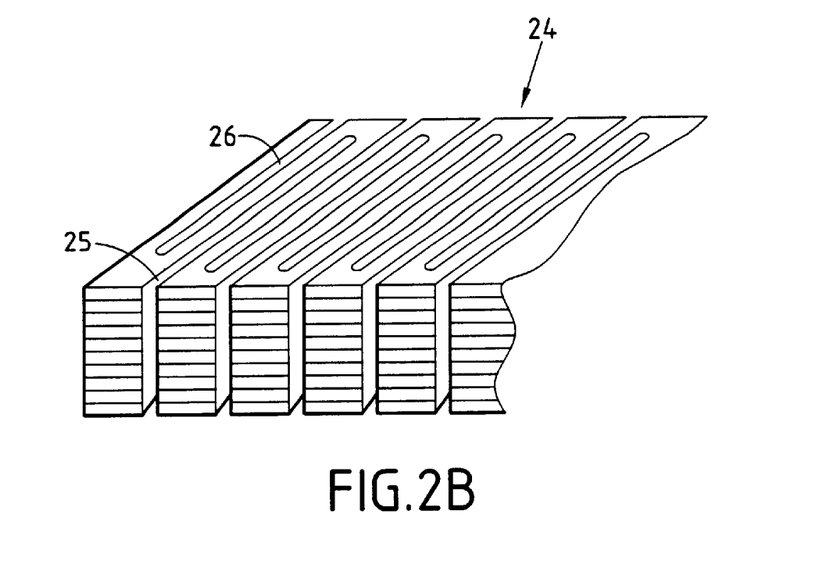

FIGS. 2A and 2B show a variant implementation of the slots 22, 23 cut out in the fiber block 21. Each slot extends over more than half the width of the block but does not pass all the way across it, and the slots start alternately from one side face 21a and from the opposite side face 21b.

After the block 11 has been expanded in the longitudinal direction $L_1$, gaps 25, 26 are formed between the portions of the fiber preform 24 corresponding to the leaves of the spring to be made (FIG. 2B).

Still in a variant, a preform 24 having gaps 25 and 26 as shown in FIG. 2B can be obtained not by cutting slots and then expanding a fiber block, but by removing fiber material corresponding to the gaps 25, 26. This "machining" of the starting fiber block can be performed by means of a tool in the form of a blade or by means of a jet of water under pressure. It can be performed after the preform has been consolidated, if the strength of the initial fiber block is insufficient.

A spring can be made from the preform of FIG. 2B in the manner described above with reference to FIGS. 1C and 1D. Nevertheless, it will be observed that when the gaps 25 and 26 are made by removing material, it is not essential to provide spacers, since it is possible to densify the preform completely in that state.

The width and the pitch of the gaps 25 and 26 can be constant or can vary, depending on whether it is desired to make a spring of constant stiffness or of differential stiffness.

FIGS. 3A to 3D show another implementation of the method for making a leaf spring out of thermostructural composite material.

Figure 3A:
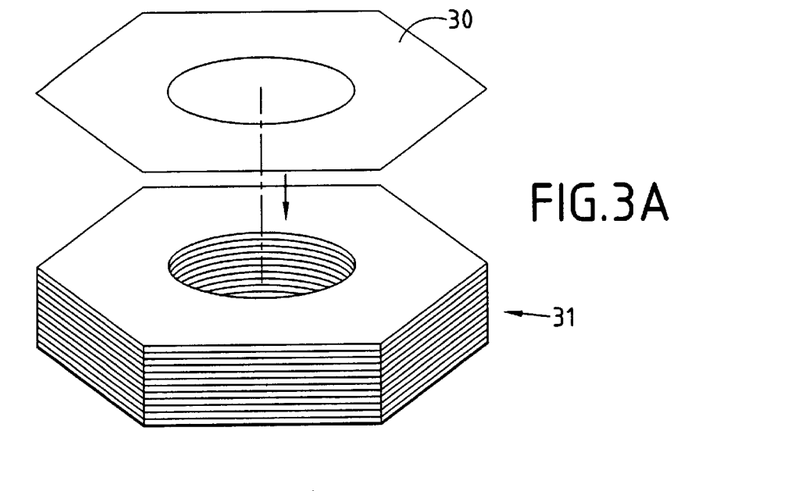
FIGS. 3A to 3D show successive steps in making another form of leaf spring out of thermostructural composite material, in a second implementation of the method of the invention.

In this example, the fiber block 31 is made to be prismatic in shape with a base having the shape desired for the leaves of the spring that is to be obtained, e.g. hexagonal with a central passage.

To this end, plies 30 (FIG. 3A) having the shape of the base of the prism are cut out from a fiber fabric, e.g. as before a woven cloth, a UD sheet, or a felt. The plies are superposed to obtain the desired length which depends on the length of the spring that is to be made. The plies are bonded together, e.g. by needling.

In a variant, the blocks 31 can be cut out from a workpiece such as the workpiece 100 of FIG. 1A.

Figure 3B:
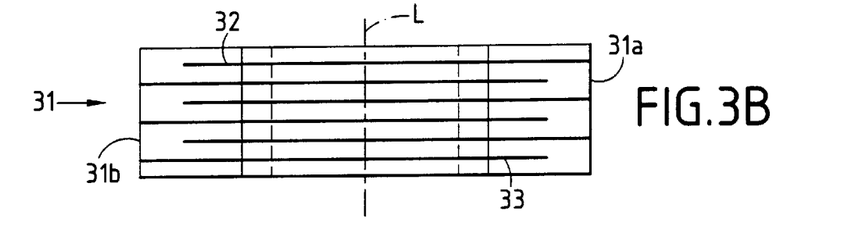
Figure 3C:
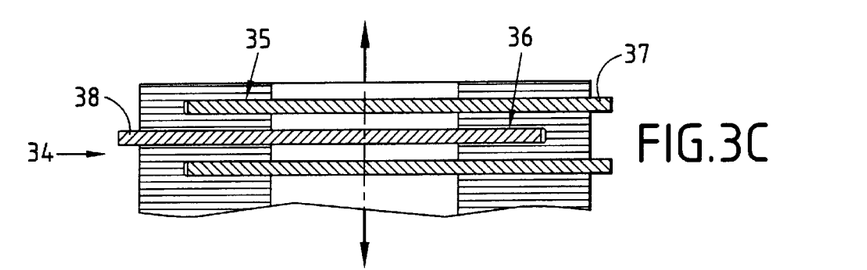

Slots 32 and 33 are cut out in the fiber block 31 perpendicularly to its longitudinal direction L which corresponds to the direction in which the final spring is to be compressed and expanded. The slots 32 and 33 extend over a major portion, but a portion only, of the section of the block 31 starting alternately from one edge 31a and from the opposite edge 31b. As shown in the side elevation of FIG. 39, the slots are made by cutting out using a blade or a jet of water under pressure.

The block 31 is then stretched in the direction L to constitute a preform having gaps 35, 36 formed by spacing apart the lips of the slots 32, 33. The fiber preform 34 as obtained in this way is held in this state by inserting spacers 37, 38 into the gaps 35, 36 as shown in section in FIG. 3C.

The preform is consolidated as described above, either by prior pre-impregnation, or by partial densification by chemical vapor infiltration.

Figure 3D:
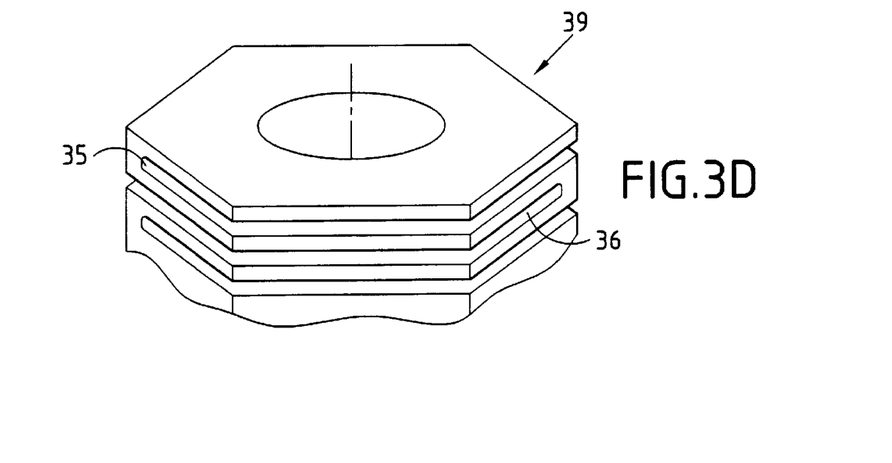

After consolidation, the spacers can be withdrawn and densification can be continued until the leaf spring 39 is obtained (FIG. 3D). It will be observed that in this example, the leaves of the spring are parallel to the plies of the fiber preform, whereas in the embodiment of FIGS. 1A to 1D they are perpendicular to the plies.

As before, a plurality of springs 39 can be taken from a single block 31 by cutting it perpendicularly to the direction L at one stage or another of the manufacturing process. It is also possible to provide springs of differential or constant stiffness by varying the width and/or the pitch of the gaps 35 and 36, or by keeping them constant.

FIGS. 4A to 4D show another implementation of the method, for making a helical spring out of thermo-structural composite material.

Figures 4A, 4B, 4C, 4D:
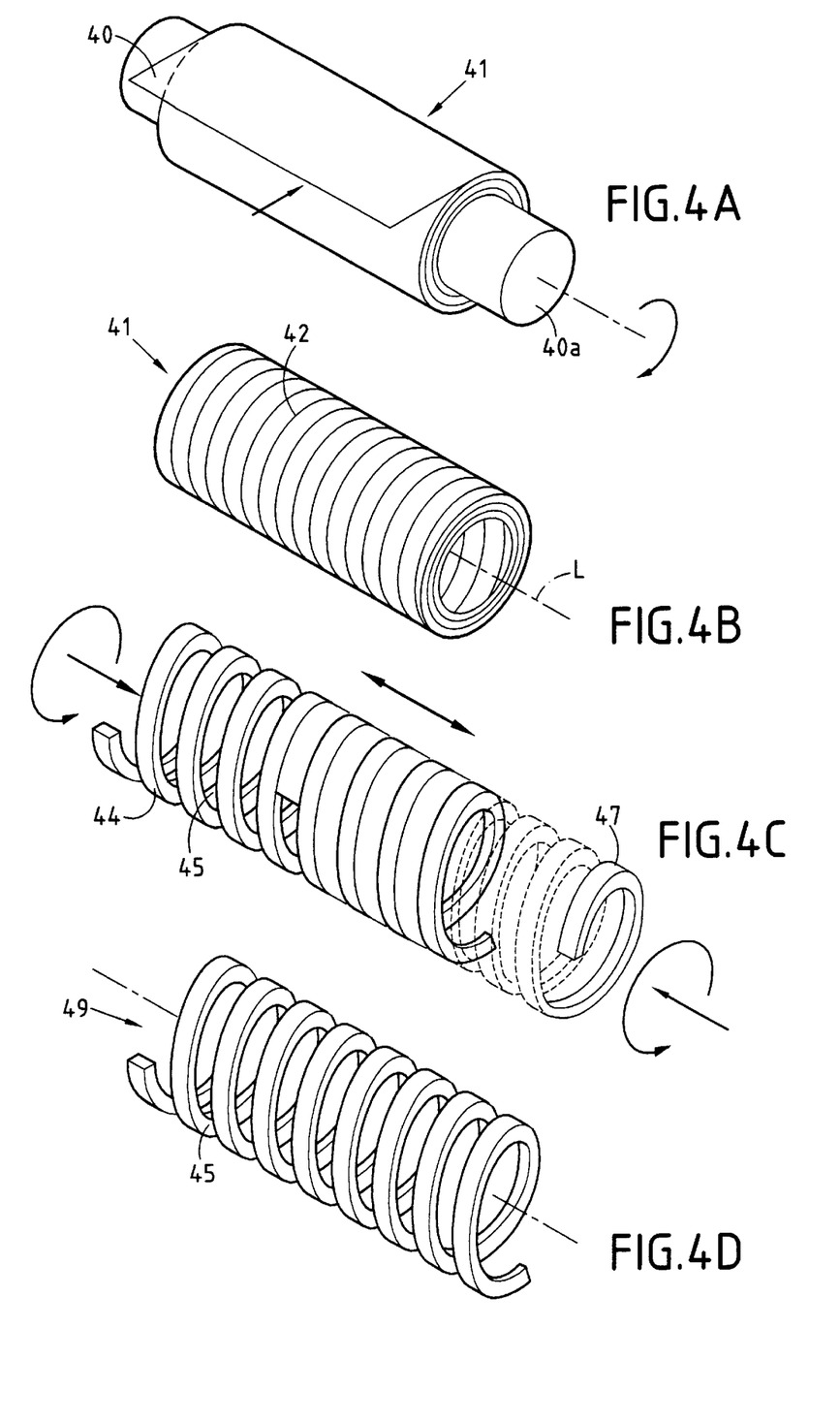
FIGS. 4A to 4D show successive steps in making a helical spring out of thermostructural composite material in a third implementation of the method of the invention.

In this example, a fiber block 41 in the form of a circular cylinder is made by winding a strip 40 of fiber fabric in superposed layers around a mandrel 40a. For example, the strip 40 may be a woven cloth, a felt, a UD sheet, or a laminate built up from a plurality of UD sheets that are superposed in different directions and that are bonded together by pre-needling.

The superposed layers of strip 40 can be needled together while the strip 40 is being wound, as described in above-mentioned document U.S. Pat. No. 4,790,052. Winding is stopped once a thickness has been reached that is a function of the thickness required for the turns of the helical spring that is to be made.

The cylindrical fiber block 41 is withdrawn from the mandrel 40a and a slot 42 of helical shape is cut through its wall thickness over its entire length, about the axis L of the block 41. The slot 42 is cut by a blade or by a jet of water under pressure, in which case the injection head is preferably placed inside the block 41.

After the slot has been formed, the block 41 is stretched in its longitudinal direction to form a helical spring preform 44 with a gap 45 between its turns.

A helical spacer 47 is inserted into the helical gap 45 by "screwing" the spacer and the preform 41 together, as shown in FIG. 4C.

The preform 41 is then consolidated either by hardening an impregnation composition inserted after the slot was formed, but before stretching, or else by partial densification by chemical vapor infiltration.

After consolidation, the spacer 47 can be withdrawn and densification of the preform can be completed by a liquid process or by a gas process. The helical spring 49 shown in FIG. 4D is then obtained.

It will be observed that in a variant, the helical gap 45 can be obtained by removing the material from the cylindrical fiber block, by cutting using a blade or a jet of water under pressure.

It will also be observed that a plurality of springs 49 can be taken from a single fiber block 41 by cutting transversely to the axis L. Cutting can be performed prior to consolidation, after densification, or after consolidation but before densification. In addition, the pitch and the width (measured in the L direction) of the helical gap 45 can be constant so that the spring is of constant stiffness, or the pitch and/or the width can vary so as to confer differential stiffness to the spring.

Figure 5A:
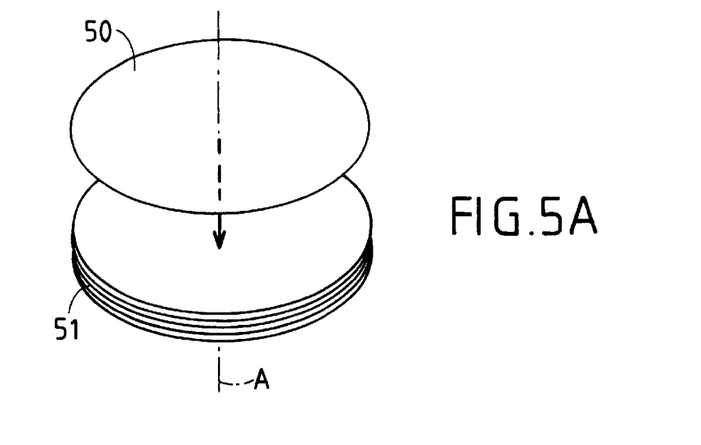
FIGS. 5A to 5C show successive steps in making a flat spiral spring out of thermostructural composite material, in a fourth implementation of the invention.
Figure 5B:
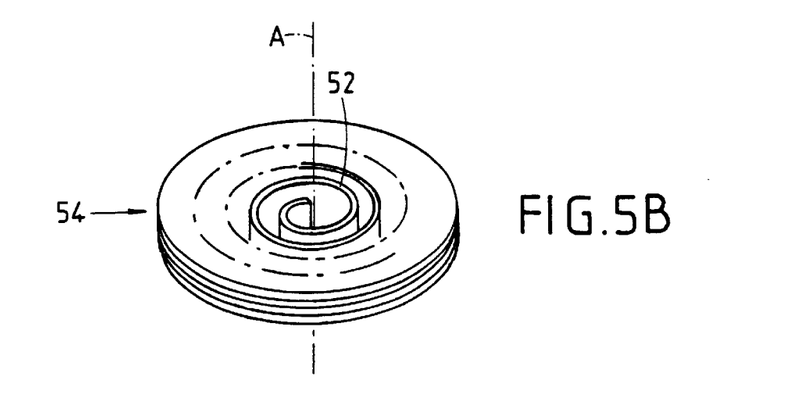
Figure 5C:
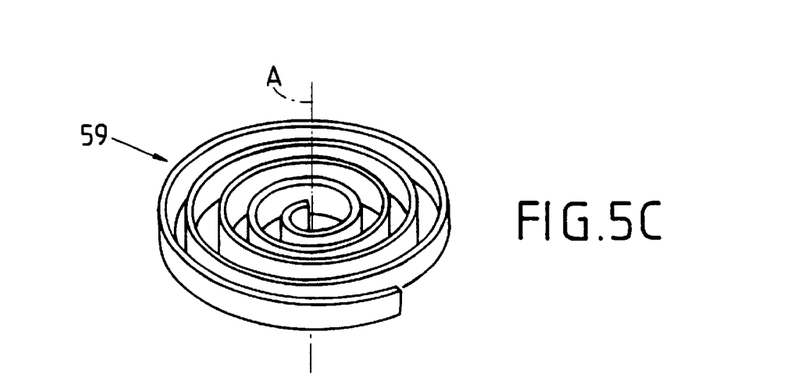

FIGS. 5A to 5C show another implementation of the method, for making a flat spiral spring out of thermo-structural composite material.

In this example, a fiber block 51 in the form of a disk having an axis A is made by superposing and needling together circular plies 50 (FIG. 5A). The plies are cut out from a fiber fabric, e.g. a woven cloth, a UD sheet, or a felt. The plies are superposed to build up a thickness corresponding to the thickness of the spring to be made.

A spiral-shaped cut 52 is formed through the disk 51 starting from its central portion and extending to its periphery (FIG. 5B). The cut 52 is made by removing material, e.g. by means of a blade or of a jet of water under pressure, and a gap of substantially constant width is formed between the portions of the preform 54 which correspond to the turns of the spring to be made.

The resulting preform 54 is densified by a liquid process or a gas process, so as to obtain the flat spiral spring 59 shown in FIG. 5C.

It will also be observed that the gap 52 can be made by means of a cut that is in the form of a simple spiral slot and by spacing the resulting turns apart. The preform can then be held in shape by means of a spiral spacer until it has been consolidated, with densification being completed after the spacer has been removed.

A plurality of springs can be taken from a single block 51 by cutting perpendicularly to the axis A. Cutting can be performed prior to consolidation, or after consolidation but before densification, or after densification.

In addition, in a variant, it is possible to cause the width and/or the pitch of the gap 52 to vary so as to obtain a spring of differential stiffness.

Figure 6A:
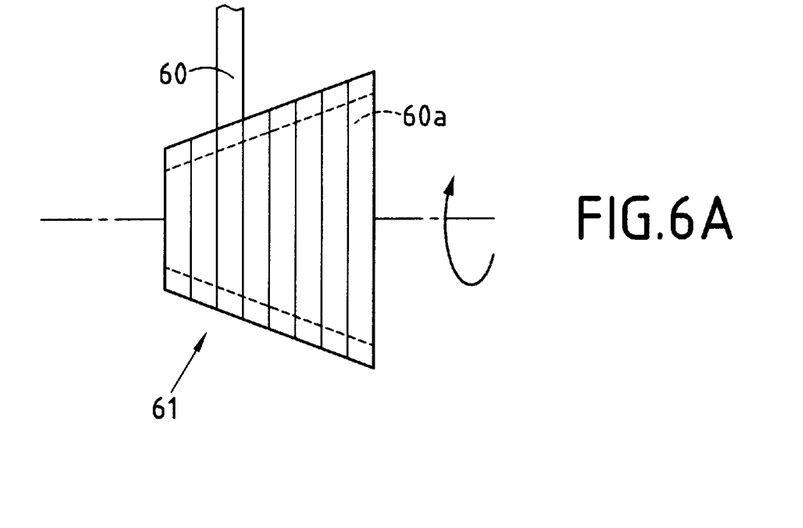
FIGS. 6A to 6c show successive steps in making a frustoconical spiral spring out of thermostructural composite material in a fifth implementation of the invention.
Figure 6B:
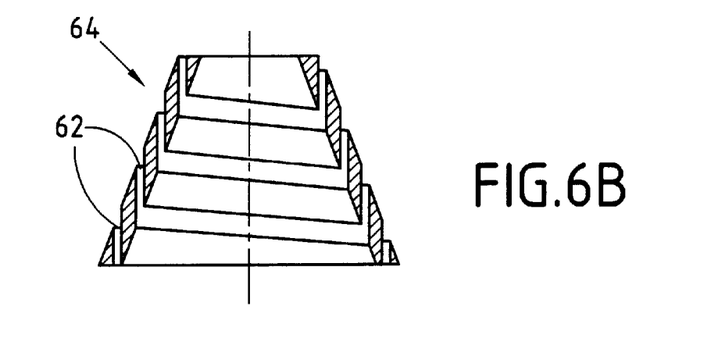
Figure 6C:
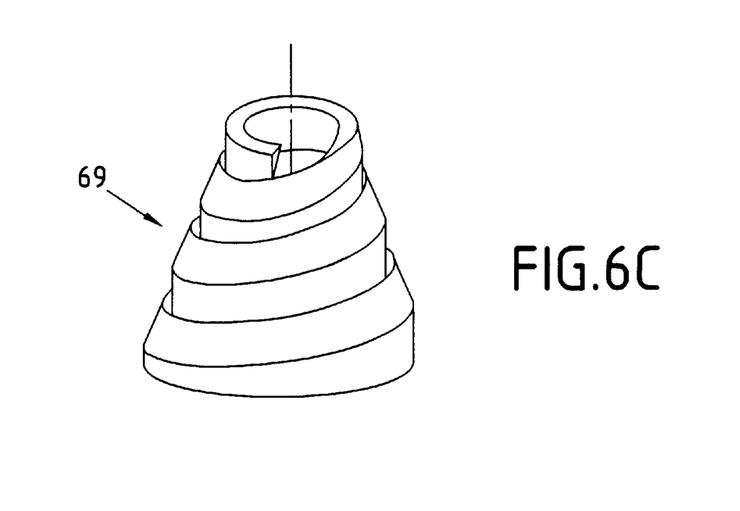

FIGS. 6A to 6C (FIG. 6B being a section view) show yet another implementation of the method, for making a conical spiral compression spring out of thermostructural composite material.

In this example, the fiber block 61 of hollow frustoconical shape is made by winding a tape 60 on a frustoconical mandrel 60a (FIG. 6a). The tape 60 is of fiber fabric. It is wound to form superposed layers, each being obtained by juxtaposed turns. The layers are bonded together by needling. The block 61 is withdrawn from the mandrel 60a after the desired thickness has been obtained.

A spiral-shaped cut 62 is made through the wall of the hollow frustoconical block 61 by removing material in a direction that is substantially parallel to the axis of the block (FIG. 6B). This machining can be performed by means of a blade or of a jet of water under pressure. The cut 62 leaves a gap of substantially constant width between the portions of the preform 64 that correspond to the turns of the spring to be made.

The preform 64 obtained in this way is densified by a liquid process or by a gas process, so as to obtain the conical spiral spring 69 shown in FIG. 6C.

It will be observed that the spiral-shaped gap can be formed after the fiber block has been consolidated if its mechanical strength is insufficient.

It will also be observed that the gap 62 can be obtained by making a cut in the form of a simple spiral slot and then spacing the resulting turns apart from one another. The resulting preform is then consolidated while the turns are held apart, e.g. by means of a spacer, with densification being continued after the spacer has been withdrawn.

In the example shown, the gap 62 is of constant width and pitch. In a variant, the gap 62 can be made to have varying width and/or pitch.

The thermostructural composite materials of the springs in the implementations of FIGS. 3A to 3D, 4A to 4D, 5A to 5C, and 6A to 6C can be of the same types as those described for the implementation of FIGS. 1A to 1D.

What is claimed is:

1. A method of making a leaf spring of a thermostructural composite material comprising a fiber reinforcement densified by a matrix, the method comprising the steps of:
   (a) making a fiber block having a prismatic shape, said fiber block being formed of a plurality of layers of fiber fabric superposed and bonded together by implanting threads or by needling;
   (b) machining said fiber block to obtain a one-piece fiber preform having a shape corresponding to that of the spring to be made, said machining comprising forming a plurality of cuts or a plurality of slots through a central portion of the fiber block between first and second opposing side zones of the fiber block, said cuts or slots starting alternately from the first side zone or the second side zone, each cut or slot being shorter than the distance between said opposing side zones,
      said cuts being formed by removing material from the fiber block to define gaps between adjacent and substantially parallel portions within the fiber block, or said slots being formed between adjacent and substantially parallel portions within the fiber block; and
   (c) densifying the machined fiber preform with a material for constituting said matrix, thereby producing said spring constituted of thermostructural composite material.

2. A method making a helical spring of a thermostructural composite material comprising a fiber reinforcement densified by a matrix, the method comprising the steps of:
   (a) making a fiber block having a Circular cylindrical shape with an axial passage, said fiber block being formed of a plurality of layers of fiber fabric superposed and bonded together by implanting threads or by needling;
   (b) machining said fiber block to obtain a one-piece fiber preform having a shape corresponding to that of the spring to be made, said machining comprising forming at least one cut or one slot through a length of said fiber block, the cut or the slot following a helical path around the axis of said fiber block,
      said cut being formed by removing material from the fiber block to define at least one gap between adjacent and substantially parallel portions within the fiber block, or said slot being formed between adjacent and substantially parallel portions within the fiber block; and
   (c) densifying the machined fiber preform with a material for constituting said matrix, thereby producing said helical spring constituted of thermostructural composite material.

3. A method for making a flat spiral spring of a thermostructural composite material comprising a fiber reinforcement densified by a matrix, the method comprising the steps of:
   (a) making a disk-shaped fiber block, said fiber block being formed of a plurality of layers of fiber fabric superposed and bonded together by implanting threads or by needling;
   (b) machining said fiber block to obtain a one-piece fiber preform having a shape corresponding to that of the spring to be made, said machining comprising forming at least one cut or one slot through said fiber block along a spiral path extending between a central portion and a periphery of said fiber block,
      said cut being formed by removing material from the fiber block to define at least one gap between adjacent and substantially parallel portions within the fiber block, or said slot being formed between adjacent and substantially parallel portions within the fiber block; and
   (c) densifying the machined fiber preform with a material for constituting said matrix, thereby producing said flat spiral spring constituted of thermostructural composite material.

4. A method for making a conical spiral spring of a thermostructural composite material comprising a fiber reinforcement densified by a matrix, the method comprising the steps of:
   (a) making a fiber block having a hollow frustro-conical shape, said fiber block being formed of a plurality of layers of fiber fabric superposed and bonded together by implanting threads or by needling;
   (b) machining said fiber block to obtain a one-piece fiber preform having a shape corresponding to that of the spring to be made, said machining comprising forming at least one cut or one slot through said fiber block along a spiral-shaped path through a length of said fiber block,
      said cut being formed by removing material from the fiber block to define at least one gap between adjacent and substantially parallel portions within the fiber block, or said slot being formed between adjacent and substantially parallel portions within the fiber block; and
   (c) densifying the machined fiber preform with a material for constituting said matrix, thereby producing said conical spiral spring constituted of thermostructural composite material.

5. A method according to any of claims 1–4, in which at least one cut is formed in the fiber block in step (b), further comprising a step of consolidation of the fiber block prior to said machining step.

6. A method according to claim 5, wherein said fiber block is consolidated by impregnation with a liquid composition and subsequent hardening.

7. A method according to claim 5, wherein said fiber block is consolidated by pre-densification by chemical vapor infiltration.

8. A method according to any of claims 1–4, in which at least one slot is formed in the fiber block in step (b), wherein said fiber preform is held in stretched state by a spacer inserted between lips.

9. A method according to claim 8, further comprising a step of consolidating said fiber preform before the densifying step, said spacer being held in place at least until consolidation of the fiber preform.

10. A method according to claim 9, wherein said fiber preform is consolidated by impregnation with a liquid composition and subsequent hardening.

11. A method according to claim 8, wherein said fiber preform is consolidated by pre-densification by chemical vapor infiltration.

* * * * *

UNITED STATES PATENT AND TRADEMARK OFFICE
CERTIFICATE OF CORRECTION

PATENT NO. : 6,231,709 B1  Page 1 of 1
DATED : May 15, 2001
INVENTOR(S) : Jean-Pierre Maumus It is certified that error appears in the above-identified patent and that said Letters Patent is hereby corrected as shown below:

Column 5,
Line 17, "39," should read -- 3B, --.

Signed and Sealed this

Fourth Day of June, 2002

Attest:

Attesting Officer

JAMES E. ROGAN
Director of the United States Patent and Trademark Office